J. LAWLER.
JOURNAL-BOXES FOR WHEELBARROWS.

No. 173,973. Patented Feb. 22, 1876.

WITNESSES.

INVENTOR.

UNITED STATES PATENT OFFICE.

JAMES LAWLER, OF CLEVELAND, OHIO.

IMPROVEMENT IN JOURNAL-BOXES FOR WHEELBARROWS.

Specification forming part of Letters Patent No. 173,973, dated February 22, 1876; application filed November 8, 1875.

*To all whom it may concern:*

Be it known that I, JAMES LAWLER, of Cleveland, in the county of Cuyahoga and State of Ohio, have invented a new and useful Improvement in Axle-Boxes for Wheelbarrows and other Similar Vehicles, of which the following is a description, reference being had to the accompanying drawings, making a part of this specification, in which—

Figure 1:
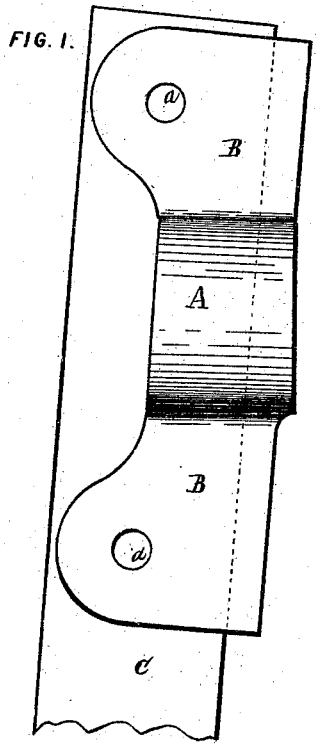
Figure 2:
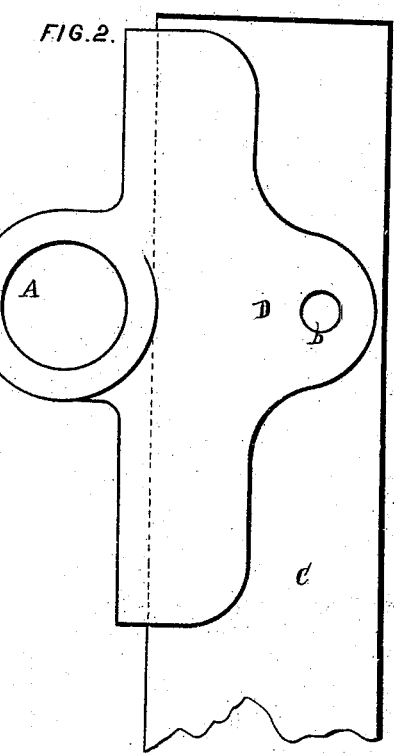
Figure 3:
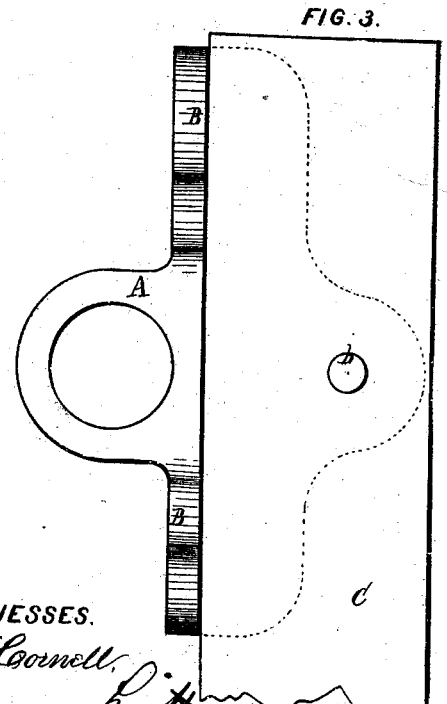
Figure 4:
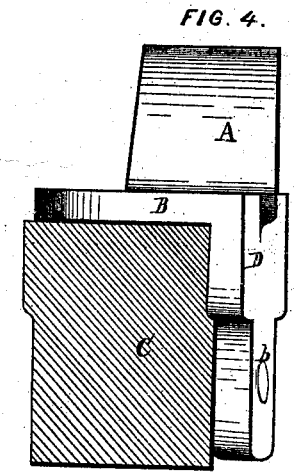

Figures 1, 2, and 3 are side views of the box. Fig. 4 is an end view.

Like letters of reference denote like parts in the several views.

The nature of this invention relates to an axle-box for wheelbarrows; and the object thereof is to provide a strong and durable box for the axle, thereby adding to the strength and durability of the vehicle.

The wheelbarrows for which this axle-box is especially intended are those of large size, used for wheeling coal and other bulky, heavy articles, requiring strong axles and boxes. Such boxes generally consist of an eye for the axle of the wheel to run in, formed in connection with a plate extending each way beyond the eye, whereby to secure it to the side pieces of the frame of the barrow. Said boxes are very liable to break across the eye at the point where it joins onto the plate; to repair which is attended by expense and for a time the loss of the use of the barrow, and to avoid which is the purpose of this invention, and the construction of which is as follows:

In the drawing, A represents the eye or box in which the axle of the wheel runs. B is a plate or wings extending each way beyond the sides of the eye. *a* are holes for the admission of bolts whereby to secure the box to the side pieces of the barrow. A section of said side pieces is shown at C. At right angles to the plate B is formed a deep flange, D, forming, with the plate B, an angle-iron, as will be seen in Fig. 4. The application of the box to the sides of the wheelbarrow will be readily understood by said Fig. 4, in which it will be seen that it is placed on the corner of the side piece with the plate on the upper side thereof and the flange against the side of it, and which is thereto secured by bolts or screws inserted in the holes *a b*.

Said boxes are made in pairs, one for the right and one for the left hand side of the barrow, and which may be either placed on the upper side or on the lower side of the side pieces. It will be obvious that in consequence of the deep flange D, in connection with the plate B, the eye or box A is greatly strengthened and cannot break, as the weight of the load is mainly sustained upon the edge of the flange, which, by its superior depth directly under the eye, makes the axle-box strong and durable.

What I claim as my invention, and desire to secure by Letters Patent, is—

The herein-described axle-box for wheelbarrows, consisting of the eye A, plate B, and flange D, substantially as set forth and for the purpose specified.

<div style="text-align:right">his<br>JAMES × LAWLER.<br>mark.</div>

Witnesses:
J. H. BURRIDGE,
D. J. LAWLER.